United States Patent
Kihara

(10) Patent No.: US 8,440,058 B2
(45) Date of Patent: May 14, 2013

(54) METHOD FOR CONCENTRATING NITROGEN ISOTOPE

(75) Inventor: Hitoshi Kihara, Chiba (JP)

(73) Assignee: Taiyo Nippon Sanso Corporation, Tokyo (JP)

(*) Notice: Subject to any disclaimer, the term of this patent is extended or adjusted under 35 U.S.C. 154(b) by 541 days.

(21) Appl. No.: 12/676,429

(22) PCT Filed: Sep. 12, 2008

(86) PCT No.: PCT/JP2008/066572
§ 371 (c)(1),
(2), (4) Date: Mar. 4, 2010

(87) PCT Pub. No.: WO2009/038024
PCT Pub. Date: Mar. 26, 2009

(65) Prior Publication Data
US 2010/0206711 A1    Aug. 19, 2010

(30) Foreign Application Priority Data
Sep. 19, 2007  (JP) ................ P2007-242987

(51) Int. Cl.
*B01D 3/42* (2006.01)
*B01D 59/04* (2006.01)
*F25J 3/02* (2006.01)

(52) U.S. Cl.
USPC ............ 203/5; 62/643; 62/919; 203/1; 203/2; 203/3; 203/71; 203/99; 203/DIG. 19; 423/249; 423/351; 423/DIG. 7

(58) Field of Classification Search ........ 62/643, 62/919; 203/1–3, 5, 71, 99, DIG. 19; 423/249, 423/351, DIG. 7
See application file for complete search history.

(56) References Cited

U.S. PATENT DOCUMENTS

| | | | | |
|---|---|---|---|---|
| 2,923,601 | A * | 2/1960 | Taylor et al. | 423/400 |
| 3,134,643 | A * | 5/1964 | Clusius | 423/249 |
| 3,487,651 | A * | 1/1970 | Schleich et al. | 62/620 |
| 6,321,565 | B1 * | 11/2001 | Kihara et al. | 62/643 |
| 6,461,583 | B1 * | 10/2002 | Hayashida et al. | 423/579 |
| 6,835,287 | B1 | 12/2004 | Kihara et al. | |
| 7,302,812 | B2 * | 12/2007 | Okasinski et al. | 62/617 |
| 7,393,447 | B2 | 7/2008 | Kihara et al. | |

FOREIGN PATENT DOCUMENTS

| | | |
|---|---|---|
| EP | 1 092 467 B1 | 8/2006 |
| JP | 11-188240 | 7/1999 |
| JP | 2001-104756 | 4/2001 |
| JP | 2003-210945 | 7/2003 |
| JP | 2003-221210 | 8/2003 |
| WO | WO 00/27509 | 5/2000 |
| WO | WO 2007/122893 | 11/2007 |

\* cited by examiner

OTHER PUBLICATIONS

International Search Report for PCT/JP2008/066572, mailed Dec. 9, 2008.

*Primary Examiner* — Virginia Manoharan
(74) *Attorney, Agent, or Firm* — Nixon & Vanderhye P.C.

(57) ABSTRACT

Method for concentrating nitrogen isotope to obtain a final product nitrogen, in which the stable nitrogen isotope, $^{15}N$, is concentrated, by low-temperature distillation of raw material nitrogen containing trace amounts of oxygen and argon using a plurality of distillation columns in a cascade arrangement. An argon-oxygen mixture is discharged from the bottom of the final column and $^{15}N$-concentrated nitrogen is extracted from a lower intermediate point of the final column. The flow rate of the argon-oxygen mixture discharged from the bottom of the final column is controlled based on the reading of a thermometer installed below the point where the final product $^{15}N$-concentrated nitrogen is extracted, thereby providing a stable nitrogen product.

4 Claims, 4 Drawing Sheets

METHOD FOR CONCENTRATING NITROGEN ISOTOPE

TECHNICAL FIELD

The present invention relates to a method for concentrating the stable nitrogen isotope, $^{15}N$, and more particularly, to a method for concentrating the stable nitrogen isotope, $^{15}N$, by combining nitrogen ($N_2$) low-temperature distillation and isotope scrambling.

This application is the U.S. national phase of International Application No. PCT/JP2008/066572 filed 12 Sep. 2008 which designated the U.S. and claims priority to JP Patent Application No. 2007-242987 filed 19 Sep. 2007, the entire contents of each of which are hereby incorporated by reference.

BACKGROUND ART

There are two types of stable nitrogen isotopes, namely $^{14}N$ and $^{15}N$, with the former being present in the natural world at 99.635 atom % and the latter being present at 0.365 atom %. In the present invention, a heavy nitrogen isotope refers to $^{15}N$.

Nitrogen in the atmosphere (molecular nitrogen: $N_2$) consists of three types of isotope molecules, namely $^{14}N_2$, $^{14}N^{15}N$ and $^{15}N_2$, and their respective prevalence in the atmosphere is as indicated below.

$^{14}N_2$: 99.635 atom % × 99.635 atom % = 99.271 mol %
$^{14}N^{15}N$: 99.635 atom % × 0.365 atom % × 2 = 0.727 mol %
$^{15}N_2$: 0.365 atom % × 0.365 atom % = 0.001 mol %

The stable nitrogen isotope, $^{15}N$, is currently used mainly as a tracer in the fields of natural science and medicine. In addition, the use of $^{15}N$ has also recently been examined in the field of energy as well.

Since $^{15}N$ has an extremely low prevalence in nature, there is a need for a method that allows it to be efficiently concentrated to high concentrations.

Examples of methods for concentrating $^{15}N$ include a chemical exchange method that utilizes the phenomenon by which the equilibrium distribution concentration of an isotope differs according to the particular compound, a vapor phase adsorption method that utilizes differences in the adsorption behavior of ammonia to zeolite attributable to the isotope effect, and a method involving concentration of $^{15}N^{18}O$ to obtain $^{15}N$ and $^{18}O$ by low-temperature distillation of nitric oxide (NO).

Methods for concentrating isotopes by low-temperature distillation include distillation of nitric oxide as described above, and carbon monoxide distillation and methane distillation for the purpose of concentrating $^{13}C$ (Japanese Unexamined Patent No. 188240, Japanese Unexamined Patent No. 210945). In addition, $^{18}O$ can be concentrated to a high concentration by combining oxygen distillation and isotope scrambling (WO 00/27509).

On the other hand, although examples of methods for concentrating $^{15}N$ to high concentrations include chemical exchange method, vapor phase adsorption method and nitric oxide (NO) distillation method, a method that combines low-temperature distillation of nitrogen ($N_2$) and isotope scrambling is the most promising for large-volume production with high purity.

Chemical exchange method and vapor phase adsorption method are not suitable for large-volume production on an industrial scale. In addition, it is ultimately not easy to obtain highly pure $N_2$ free of impurities other than $N_2$ since isotope separation is mediated by nitrogen compounds.

Nitric oxide distillation has similar problems since oxygen molecules must be separated in a subsequent step. Moreover, since nitric oxide is both toxic and corrosive, it also has the problem of resulting in difficult handling.

Although concentration by low-temperature distillation method is promising for large-volume production, this method has the problems indicated below in the case concentrating $^{15}N$ to a final isotope concentration of 50 atom % or higher.

The composition of isotope molecules of nitrogen consists of $^{14}N_2$ at 99.272 mol %, $^{14}N^{15}N$ at 0.727 mol % and $^{15}N_2$ at 13.3 mol-ppm. Although it is possible to concentrate $^{14}N^{15}N$ nitrogen molecules containing 50% $^{15}N$ provided they are concentrated to no higher than about 50 atom %, it is not easy to concentrate $^{15}N$ to 80 atom %. This is because, in this case, $^{15}N_2$ must be concentrated to at least 60 mol % (with the remaining 40 mol % assumed to be $^{14}N^{15}N$), and even if $^{15}N_2$ nitrogen molecules were concentrated at a yield of 100%, for example, this would require 45000 times or more raw material than the amount of the final product.

In order to concentrate $^{15}N$ to 99 atom %, $^{15}N_2$ must be concentrated to at least 98 mol % (with the remaining 2 mol % assumed to be $^{14}N^{15}N$), thus requiring nearly 74,000 times more raw material than the amount of the final product even if the yield of $^{15}N_2$ was 100%.

In this case, since a large amount of $^{14}N^{15}N$ is discarded, the yield of $^{15}N$ is only 0.368%, thus making this inefficient as an isotope separation process as well.

It is unrealistic to assume a value of 100% for the yield of $^{15}N_2$, and in actuality, roughly 10 times or more of raw material is considered to be required. Thus, the yield of $^{15}N$ is one-tenth that or less.

In this manner, in the case of concentrating $^{15}N$ by low-temperature distillation of the diatomic molecule of nitrogen, $N_2$, the level of difficulty is completely different depending on whether the final isotope concentration is to be 50 atom % or more, or 50 atom % or less. If the final isotope concentration is only required to be 50 atom % or less, although this can be accomplished simply by concentrating $^{14}N^{15}N$ that is present in comparatively abundant amounts, if the final isotope concentration is to be 50 atom % or more, it is necessary to concentrate $^{15}N_2$, which is only present in extremely small amounts, thereby requiring a large amount of raw material.

Moreover, not only is a large amount of raw material required if the final isotope concentration is to be 99 atom %, since nearly all of the comparatively abundant $^{14}N^{15}N$ is discarded, the process has extremely poor efficiency. Thus, it is realistically impossible to obtain $^{15}N$ at a concentration of, for example, 80 atom % or more by low-temperature distillation of nitrogen alone.

As a means of solving such problems, the applicant has previously filed a patent application for a method that combines nitrogen distillation and isotope scrambling as described in International Publication No. WO 2007/1228934.

DISCLOSURE OF THE INVENTION

Problems to be Solved by the Invention

The aforementioned Patent Document 4 describes a method comprising a distillation step in which a plurality of distillation columns provided with condensers and reboilers are connected in series in the form of a cascade arrangement, and nitrogen ($N_2$) is continuously distilled at a low temperature to concentrate a component containing $^{15}N$, and a step in which a portion of the nitrogen during distillation is subjected to isotope scrambling, and the nitrogen following the isotope scrambling is returned to the distillation step.

According to this invention, the effect is obtained that enables nitrogen ($N_2$) having a concentration of $^{15}N$ of 50 atom % or more to be obtained from the vicinity of the lower portion of a final distillation column.

However, in the case trace amounts of argon and oxygen are contained in the raw material nitrogen ($N_2$), the argon and oxygen are concentrated to high concentrations in the bottom of the final column of the distillation apparatus, thereby resulting in the risk of contamination of the final $^{15}N$-concentrated nitrogen ($N_2$).

In order to avoid this problem, together with extracting nitrogen ($N_2$), in which a stable isotope of nitrogen ($^{15}N$) has been concentrated to a high concentration, from the intermediate point of the final column, it is necessary to discharge the mixture of argon and oxygen from the bottom of the final column.

At this time, in order to obtain nitrogen in which $^{15}N$ has been concentrated to a high concentration, it is necessary to prevent argon and oxygen from contaminating the final product. In addition, in order to increase the yield, it is necessary to ensure that $N_2$ containing $^{15}N$ is not discharged from the bottom of the final column together with the mixture of argon and oxygen.

Accordingly, an object of the present invention is to provide a method for concentrating nitrogen isotope by carrying out low-temperature distillation of nitrogen by connecting a plurality of distillation columns in series in a cascade arrangement, and after a portion of the nitrogen extracted from the distillation process is subjected to isotope scrambling, returning to the distillation process, wherein contamination of the final product nitrogen by argon and oxygen, which is caused by concentration of argon and oxygen present in trace amounts in the raw material being concentrated along with the final $^{15}N$-concentrated nitrogen ($N_2$) in the vicinity of the bottom of the final distillation column, is prevented while also preventing a decrease in the yield of the $^{15}N$-concentrated nitrogen.

Means for Solving the Problems

The present invention employs the following constitutions to solve the aforementioned problems.
[1] A method for concentrating nitrogen isotope comprising a step for obtaining a final product nitrogen, in which the stable nitrogen isotope, $^{15}N$, has been concentrated, by low-temperature distillation of raw material nitrogen containing trace amounts of oxygen and argon with a plurality of distillation columns composed in a cascade arrangement, wherein together with discharging an argon-oxygen mixture from the bottom of the final column and extracting a $^{15}N$-concentrated nitrogen fluid from a lower intermediate point of the final column, the flow rate of the argon-oxygen mixture discharged from the bottom of the final column is controlled based on the reading of a thermometer installed below the point where the final product $^{15}N$-concentrated nitrogen is extracted, thereby enabling the final product nitrogen to be stably obtained.
[2] The method for concentrating nitrogen isotope described in [1] above, wherein the reading of the thermometer is within a range of +0.5 to +8K of the saturated temperature of nitrogen at the operating pressure.
[3] The method for concentrating nitrogen isotope described in [1] or [2] above, wherein nitrogen contained in the argon-oxygen mixture in the bottom of the final column is 1 mol % or less.
[4] The method for concentrating nitrogen isotope described in any one of [1] to [3] above, wherein the total amount of argon and/or oxygen contained in the final product $^{15}N$-concentrated nitrogen is 100 ppm or less.

In nitrogen isotope concentration by which final product nitrogen ($N_2$), in which the stable nitrogen isotope, $^{15}N$, has been concentrated to 90 atom % or more, is obtained by low-temperature distillation using a distillation column that uses a random packing or structured packing (to be referred to as a "packed column"), nitrogen ($N_2$), in which a stable nitrogen isotope ($^{15}N$) has been concentrated to a high concentration, can be obtained from a intermediate point (located several meters from the column bottom) of the final column of a plurality of packed columns connected in series in a cascade arrangement.

FIG. 1 schematically shows an apparatus that combines nitrogen distillation and isotope scrambling.

As was previously described, argon and oxygen contained in trace amounts in the raw material nitrogen (feed) are concentrated to high concentrations in the bottom of the final column of the distillation apparatus.

In this method, the flow rate (which may also be referred to as the final column bottom purge flow rate or purge flow rate) of the mixture of argon and oxygen (waste 2) extracted from the bottom of the final column must be at a suitable level.

This is because if the final column bottom purge flow rate is excessively large, nitrogen is extracted along with the argon and oxygen causing the target component in the form of $^{15}N_2$ to also be discharged, while conversely if the final column bottom flow rate is excessively small, argon and/or oxygen end up being present in the final product nitrogen (product ($^{15}N_2$)) extracted from the lower intermediate point of the final column.

During stable isotope distillation, the amount of the final product is extremely small since the target component is only present in a trace amount in the raw material. For example, in the case the amount of the final product is 1/10000 the raw material flow rate, argon and oxygen contained in the raw material are concentrated 10000 times. More specifically, in the case the concentration of oxygen in the raw material is 0.1 ppm, it is concentrated to 0.1% in the final product. If argon is present in the raw material at 10 ppm, it is concentrated to 10% in the final product.

Consequently, in order to obtain highly concentrated $^{15}N_2$, it is necessary to obtain nitrogen (product) from a lower intermediate point of the final column while discharging the mixture of argon and oxygen (waste 2) containing hardly any nitrogen from the bottom of the final column in the form of a gas or liquid.

If the final column bottom purge flow rate (waste 2) is equal to the total of argon and oxygen accompanying the raw material nitrogen (feed), then the presence of argon and oxygen in the product ($^{15}N_2$) and the presence of $^{15}N_2$ in the waste 2 can theoretically be prevented.

For example, as shown in FIG. 2, a method can be conceived in which a concentration meter 1 for detecting argon and oxygen concentrations in the product and a concentration meter 2 for measuring nitrogen concentration in the waste 2 are provided, and a final column bottom purge flow rate control valve 4 is regulated by a control device 3 so that they are not detected.

However, it is difficult to realize an operating method actually capable of accurately measuring the contents of trace amounts of argon and oxygen in raw material nitrogen, and then determining the final column bottom purge flow rate. In addition, there is the risk of the system becoming excessively complex even if such control were possible.

Therefore, in the present invention, contamination of the final product nitrogen ($^{15}N_2$) by argon and oxygen is prevented using the method described below.

In addition to discharging the argon-oxygen mixture from the bottom of the final column and extracting a $^{15}N$-concentrated nitrogen fluid from a lower intermediate point of the final column, the flow rate of the argon-oxygen mixture discharged from the bottom of the final column is controlled based on the reading of a thermometer installed below the point where the product $^{15}N$-concentrated nitrogen is extracted.

The reading of the thermometer is within the range of +0.5 to +8K of the saturated temperature of nitrogen at the operating pressure.

In the present invention, since the boiling points of the main fluid in the apparatus in the form of nitrogen and impurities in the form of argon and oxygen differ considerably, and the composition changes rapidly with respect to the height direction of the distillation column, it is easy to detect concentration of argon and/or oxygen by measuring temperature.

Nitrogen contained in the argon-oxygen mixture in the bottom of the final column can be made to be 1 mol % or less, and the total amount of argon and/or oxygen contained in the final product $^{15}N$-concentrated nitrogen can be made to be 100 ppm or less.

Effects of the Invention

According to the present invention, suitable amounts of argon and oxygen concentrated in the bottom of a final column can be purged using a simple control method. As a result, contamination of a $^{15}N$ product by argon and oxygen can be prevented while also preventing $^{15}N_2$ from being discarded along with the argon and oxygen.

Accordingly, $^{15}N$-concentrated nitrogen can be produced more efficiently than in the prior art.

BRIEF DESCRIPTION OF THE REFERENCE SYMBOLS

Figure 1:
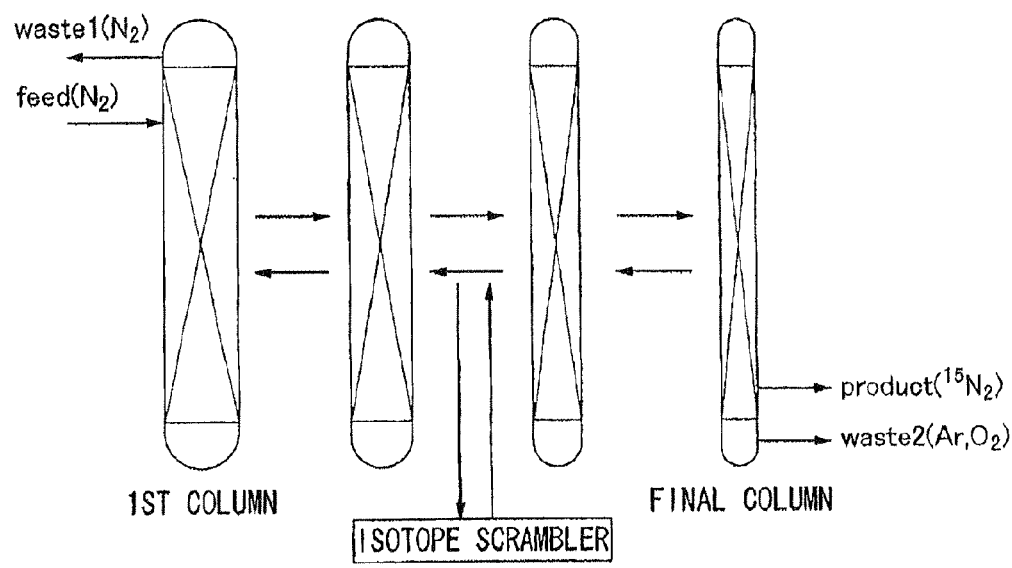
FIG. 1 is a diagram showing the general configuration of a distillation apparatus used in the method of the present invention.
Figure 2:
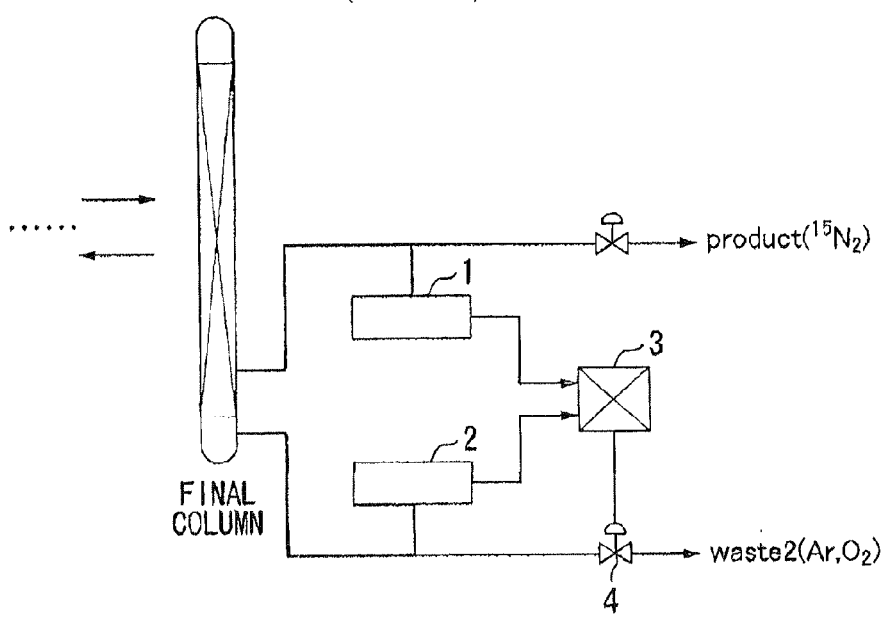
FIG. 2 is a general diagram showing a method for controlling purge flow rate of the prior art.

5: Thermometer
6: Control device
7: Flow rate control valve

BEST MODE FOR CARRYING OUT THE INVENTION

The following provides an explanation of an embodiment of the present invention in the form of a method for concentrating nitrogen isotope while suitably referring to the drawings.

Figure 3:
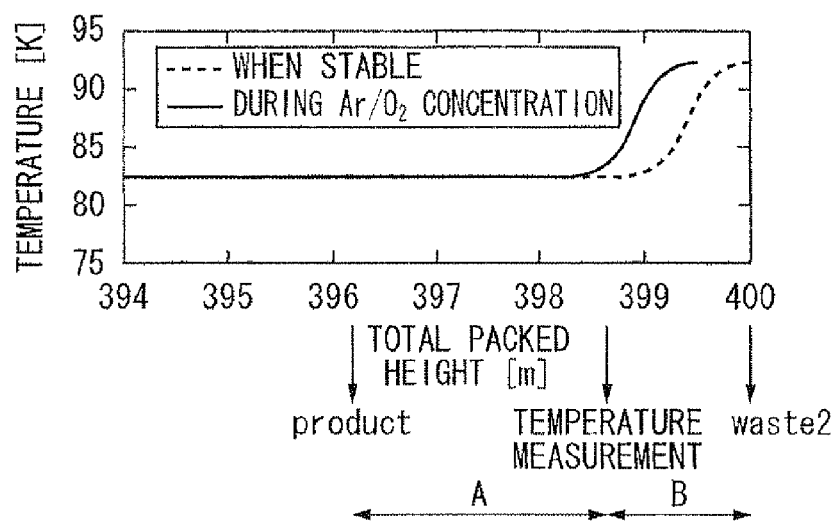
FIG. 3 is a graph showing the relationship between total packed height of a distillation column and internal temperature.
Figure 4:
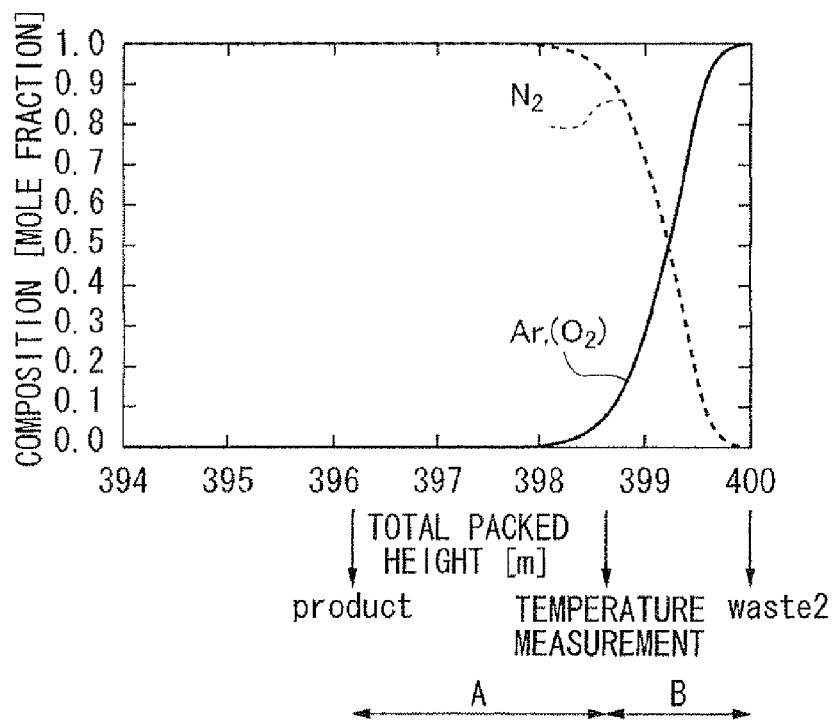
FIG. 4 is a graph showing the relationship between total packed height of a distillation column and composition ratios of oxygen, argon and nitrogen.
Figure 5:
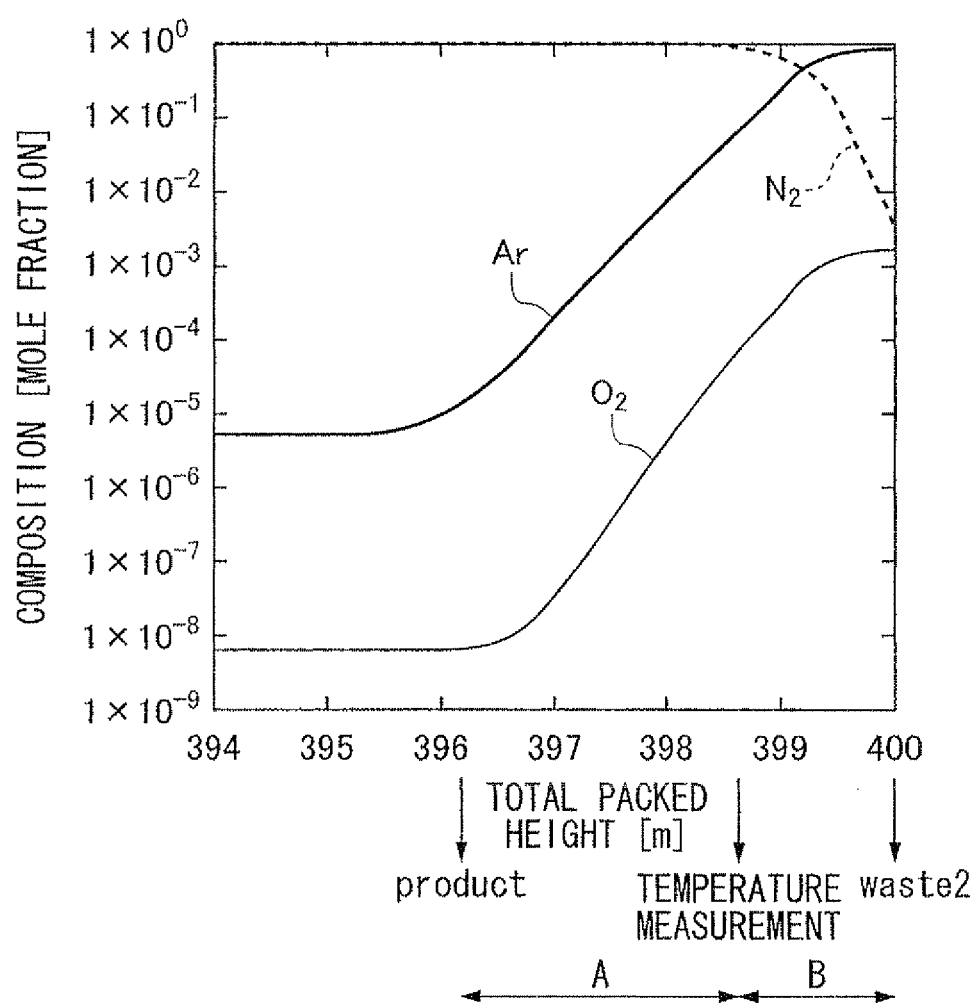
FIG. 5 is a graph showing the relationship between total packed height of a distillation column and composition ratios of oxygen, argon and nitrogen.

FIGS. 3 to 5 show examples of temperatures in the vicinity of the bottom of a final column of a $^{15}N$ isotope distillation apparatus having a total packed height of 400 m and composition ratios of nitrogen, argon and oxygen. FIG. 5 is the same as FIG. 4 with the exception of the vertical axis being in the form of a logarithmic scale. Nitrogen isotope composition is not taken into consideration in FIGS. 4 and 5.

As can be understood from FIGS. 4 and 5, hardly any nitrogen is contained in the argon-oxygen mixture purged from the bottom of the final column. Nitrogen composition increases rapidly moving from the bottom to the top of the column, and the temperature of the distillation column decreases accompanying that increase (due to the difference in boiling points).

In addition, as can be understood from FIGS. 3 and 4, temperature change within the distillation column is comparatively large when the nitrogen composition is generally within the range of 10 to 70%.

Figure 6:
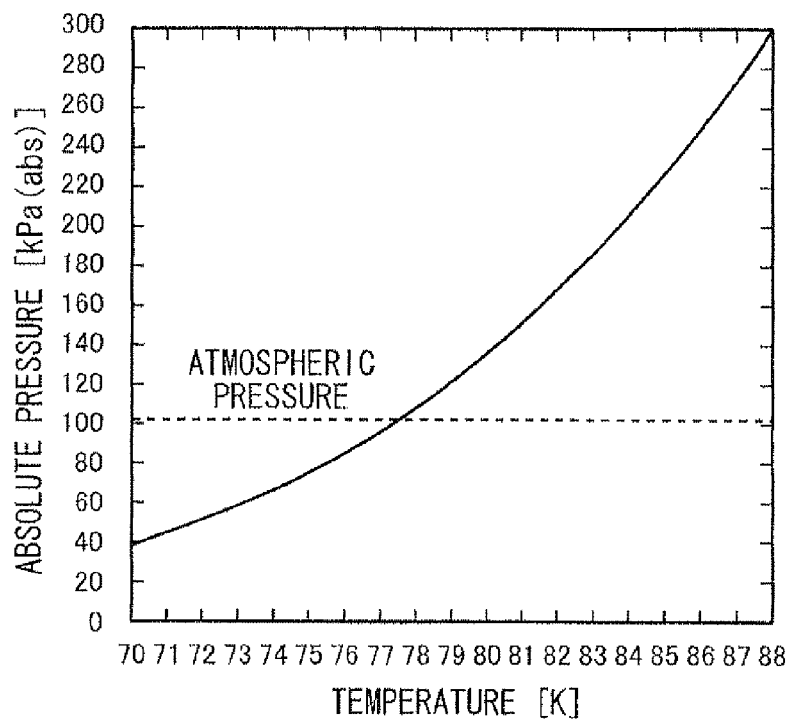
FIG. 6 is a graph showing the relationship between nitrogen vapor pressure and temperature.

Moreover, there is little temperature change when the nitrogen composition is generally within the range of 70% or more, and when the nitrogen composition reaches 90% or more, the temperature becomes a value near the boiling point of nitrogen at that pressure. In the examples of FIGS. 3 and 4, since the operating pressure is 170 kPa (abs), the column temperature is the boiling point of nitrogen at that pressure, namely about 82K. FIG. 6 shows nitrogen vapor pressure versus temperature.

The present invention utilizes the drastic change in temperature distribution in the bottom of the final column as described above.

The temperature of the distillation column at a intermediate point between the final column bottom and the point where the final product $^{15}N$-concentrated nitrogen is extracted, where is 398.6 m, for example in FIGS. 3 to 5 (1.4 m above the final column bottom), is measured continuously. Since the argon-oxygen mixture is not concentrated in the final column bottom immediately after starting the apparatus, the measured temperature value is equal to the saturated temperature Ts at the operating pressure, namely about 82K. Purging of the final column bottom is discontinued during this time.

As operation of the apparatus continues, high boiling point components in the form of argon and oxygen contained in trace amounts in the raw material nitrogen begin to be concentrated, and the measured temperature value rises accompanying this concentration (indicated with the thin line in FIG. 3).

When this temperature reaches a set temperature T1 of, for example, 84K, purging of the final column bottom is started, and when the temperature reaches a set temperature T2 of about 83K or lower, purging is again discontinued. T2 must be set higher than Ts in order to discontinue purging of argon and oxygen.

T2 is preferably set to be 0.5K or more higher than Ts in consideration of temperature fluctuations caused by fluctuations in the operating pressure of the apparatus. Although T1 must be higher than T2, since the purge flow rate of the argon-oxygen mixture changes frequently if the values of T1 and T2 are close, T1 is preferably set to be 1K or more higher than T2.

Although T1 must be lower than the saturated temperature of argon at the operating pressure in order to begin purging the argon-oxygen mixture, since the difference in saturated temperatures between nitrogen and argon is generally about 10K, T1 is actually preferably set to be lower than Ts+8K. The purge flow rate is preferably set to a large enough value so that the measured temperature begins to decrease gradually. If the flow rate is excessively low, the measured temperature continues to rise, while if the flow rate is excessively high, the measured temperature ends up decreasing rapidly.

Although it was described in the previous explanation that purging is discontinued when the temperature becomes equal to or lower than the set temperature T2, purging is not necessarily required to be discontinued as long as the flow rate is low enough to allow concentration of argon and oxygen before too long.

As a result of controlling temperature as described above, the temperature of the distillation column (final column) at the point where the thermometer is installed generally changes between T2 and T1. Although depending on the set values of T1 and T2, the composition of nitrogen at the point where temperature is measured changes within the range of 90 to 10 mol %. Although the composition at the bottom of the column also changes in coordination with this change, the distance between the installed point of the thermometer and the column bottom (area B in FIG. 4; 1.4 m in the previous example) must be large enough so that the nitrogen component at the column bottom is at least 1 mol % or less, and if possible 0.1 mol % or less, at all times. However, since the height of the distillation column ends up being wasted if this distance is excessively large, it is set to a suitable distance from the viewpoint of economy.

However, final product $^{15}$N-concentrated nitrogen is typically required to have high purity. It is therefore necessary to suitable select the point where the $^{15}$N-concentrated nitrogen is extracted. Namely, the packed height from the point where temperature is measured to the point where the final product $^{15}$N-concentrated nitrogen is extracted (area A in FIG. 4; 2.3 m in the previous example) must be large enough so that the purity of the final product nitrogen is at least 99.99 mol % or more, and is possible 99.999 mol % or more. However, if the packed height is excessively large, in addition to the height of the distillation column being wasted, since the concentration of $^{15}$N isotopes in the final product $^{15}$N-concentrated nitrogen decreases, the packed height is required to be set to a suitable height.

Specific Examples

The following indicates specific examples. However, the present invention is not limited to these specific examples.

Figure 7:
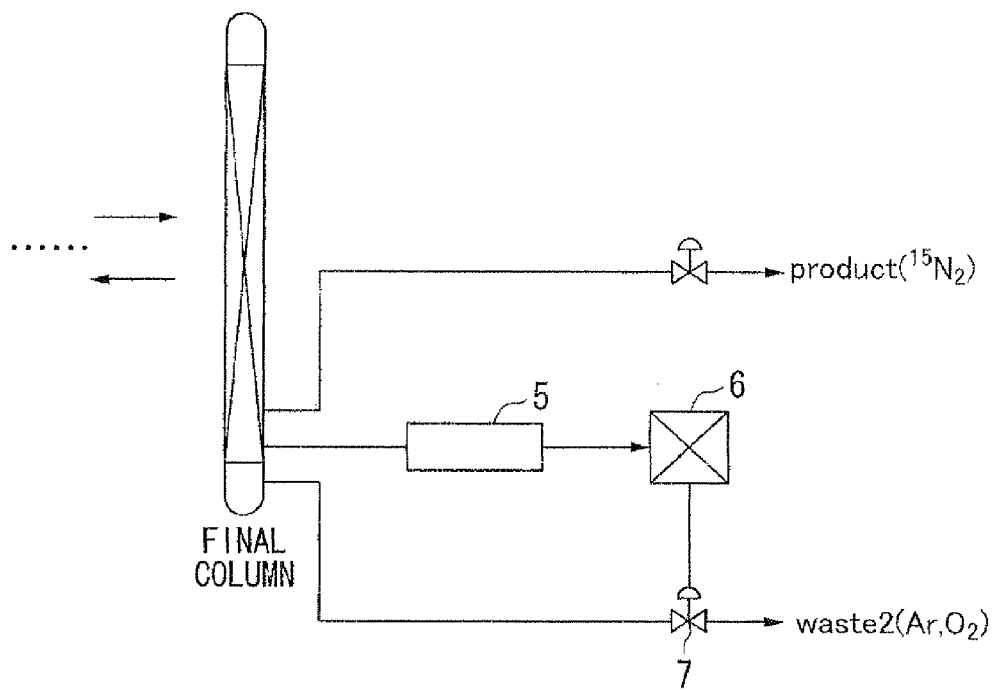
FIG. 7 is a general diagram showing a method for controlling purge flow rate in the method of the present invention.

The configuration shown in FIG. 7 was employed for final product and final column bottom purge flow rate control in a process for obtaining final product $^{15}$N-concentrated nitrogen from raw material nitrogen containing 50 ppm of argon and 0.1 ppm of oxygen using the $^{15}$N isotope separation apparatus shown in FIG. 1 (although the condenser and reboiler are not shown in the drawing) having a total packed height of 400 m and operating pressure of 170 kPa (abs). In the configuration shown in FIG. 7, reference numeral 5 indicates the previously described thermometer that is used to measure the temperature at the distillation column. Reference numeral 6 indicates a control device that is able to control. purge flow rate by transmitting a signal for controlling purge flow rate to a flow rate control valve 7 based on a signal from the thermometer 5.

The set temperature T1 at which purging begins was set to 85K, and the set temperature T2 at which purging is discontinued was set to 82.5K.

A distance $H_B$ between the temperature measuring point and the column bottom was set to 1.4 m according to the Fenske equation shown below since the relative volatility α of an N$_2$—Ar system at an operating pressure of 170 kPa (abs) is generally about 2.6, the HETP of the packing used is 0.2 (m/plate), and the nitrogen concentration at the temperature measuring point is a maximum of about 70 mol % (equivalent to T2=82.5K).

$$n_B+1=\log[\{Y_{Nmid}/(1-Y_{Nmid})\}/\{Y_{Nbot}/(1-Y_{Nbot})\}]/\log(\alpha) \quad (1)$$

$$H_B=n_B\times HETP \quad (2)$$

$H_B$ [m]: Minimum required packed height in area B
HETP [m/plate]: Height equivalent to a theoretical plate
$n_B$ [plate]: Minimum required number of theoretical plates in area B
$Y_{Nmid}$ [–]: Mole fraction of nitrogen at temperature measuring point
$Y_{Nbot}$ [–]: Mole fraction of nitrogen at column bottom
α [–]: Relative volatility of nitrogen relative to main component (argon or oxygen) of column bottom purge gas at the operating pressure;
can be designed on the safe side by using the relative volatility of an N$_2$—Ar system (which is smaller than that of an N$_2$—O$_2$ system)

$$n_B=\log[\{0.70/(1-0.70)\}/\{0.001/(1-0.001)\}]/\log(2.6)-1\approx 7.1 \quad (1)$$

$$H_B=7.1\times 0.2=1.4\,m \quad (2)$$

In addition, a distance $H_A$ between the point where $^{15}$N-concentrated final product is extracted and the temperature measuring point was set to 2.3 m according to the Fenske equation below since the nitrogen concentration at the temperature measuring point is a minimum of about 40 mol % (equivalent to T1=85K).

$$n_A+1=\log[\{Y_{Np}/(1-Y_{Np})\}/\{Y_{Nmid}/(1-Y_{Nmid})\}]/\log(\alpha) \quad (3)$$

$$H_A=n_A\times HETP \quad (4)$$

$H_A$ [m]: Minimum required packed height in area A
HETP [m/plate]: Height equivalent to a theoretical plate
$n_A$ [plate]: Minimum required number of theoretical plates in area A
$Y_{Np}$ [–]: Mole fraction of nitrogen at final product $^{15}$N-concentrated nitrogen (product) extraction point
$Y_{Nmid}$ [–]: Mole fraction of nitrogen at temperature measuring point
α [–]: Relative volatility of nitrogen relative to main component (argon or oxygen) of column bottom purge gas at the operating pressure;
can be designed on the safe side by using the relative volatility of an N$_2$—Ar system (which is smaller than that of an N$_2$—O$_2$ system $$n_A=\log[\{0.99999/(1-0.99999)\}/\{0.40/(1-0.40)\}]/\log(2.6)-1\approx 11.5 \quad (3)$$

$$H_A=11.5\times 0.2=2.3\,m \quad (4)$$

When controlled in the manner described above, temperature distribution and component distribution became as shown in FIGS. 3 to 5, the final product was not contaminated by argon and oxygen, and liquid purged from the column

The invention claimed is:

1. A method for concentrating nitrogen isotope, $^{15}N$, comprising;
a step for low-temperature distillation combined with isotope scrambling from raw material nitrogen containing trace amounts of oxygen and argon within a plurality of distillation columns composed in a cascade arrangement, thereby obtaining a final product nitrogen that is $^{15}N$-concentrated nitrogen, wherein
the distillation columns include a final column which discharges an argon-oxygen mixture at a controllable flow rate from the bottom of the final column and extracts the $^{15}N$-concentrated nitrogen from a lower intermediate point of the final column, wherein the final product nitrogen is stably obtained by controlling the flow rate of the argon-oxygen mixture discharged from the bottom of the final column based on the reading of a thermometer installed below the point where the $^{15}N$-concentrated nitrogen is extracted.

2. The method for concentrating nitrogen isotope according to claim 1, wherein the reading of the thermometer is within a range of +0.5 to +8K of the saturated temperature of nitrogen at the operating pressure.

3. The method for concentrating nitrogen isotope according to claim 1, wherein nitrogen contained in the argon-oxygen mixture in the bottom of the final column is 1 mol % or less.

4. The method for concentrating nitrogen isotope according to claim 1, wherein the total amount of argon and oxygen contained in the final product $^{15}N$-concentrated nitrogen is 100 ppm or less.

* * * * *